(12) United States Patent
Nakayama et al.

(10) Patent No.: US 8,885,232 B2
(45) Date of Patent: Nov. 11, 2014

(54) SCANNER LENS, IMAGE READER AND IMAGE FORMING DEVICE

(71) Applicants: Hirotoshi Nakayama, Isehara (JP); Masahiro Itoh, Sagamihara (JP)

(72) Inventors: Hirotoshi Nakayama, Isehara (JP); Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/960,370

(22) Filed: Aug. 6, 2013

(65) Prior Publication Data

US 2014/0043662 A1    Feb. 13, 2014

(30) Foreign Application Priority Data

Aug. 8, 2012 (JP) ................. 2012-175774

(51) Int. Cl.
| | |
|---|---|
| H04N 1/04 | (2006.01) |
| H04N 1/46 | (2006.01) |
| G06K 15/00 | (2006.01) |
| G03F 3/10 | (2006.01) |
| G02B 13/00 | (2006.01) |
| H04N 1/028 | (2006.01) |
| G02B 27/00 | (2006.01) |
| G02B 13/18 | (2006.01) |
| G02B 9/62 | (2006.01) |

(52) U.S. Cl.
CPC ............. *H04N 1/02895* (2013.01); *G02B 9/62* (2013.01); *G02B 13/0005* (2013.01); *G02B 27/0031* (2013.01); *G02B 13/18* (2013.01); *H04N 1/028* (2013.01)
USPC ........... 358/475; 358/509; 358/483; 358/474; 358/1.14; 358/513; 358/527

(58) Field of Classification Search
USPC ......... 358/475, 509, 483, 474, 1.14, 513, 527
See application file for complete search history.

(56) References Cited

U.S. PATENT DOCUMENTS 6,191,894 B1 * 2/2001 Kitamura et al. ............. 359/676
6,215,599 B1 * 4/2001 Ohtake ......................... 359/688

(Continued)

FOREIGN PATENT DOCUMENTS

| JP | 2002-82282 | 3/2002 |
| JP | 2002-244033 | 8/2002 |
| JP | 3862446 | 10/2006 |
| JP | 2007-219529 | 8/2007 |

OTHER PUBLICATIONS

U.S. Appl. No. 13/792,341, filed Mar. 11, 2013.

*Primary Examiner* — Charlotte M Baker
*Assistant Examiner* — Rury Grisham
(74) *Attorney, Agent, or Firm* — Oblon, Spivak, McClelland, Maier & Neustadt, L.L.P.

(57) ABSTRACT

A scanner lens includes a first lens group with a positive refractive power, having a first positive lens and a second negative lens which are cemented, second to fifth lens groups having a third negative lens, a fourth positive lens, a fifth negative lens, and a sixth negative lens, respectively, arranged in order from an object side to an image side, and an aperture stop disposed between the first and second lens groups. The scanner lens satisfies the following three conditions:

$0.01 < BF/L < 0.10$ $0.50 < f1/f < 9.5$ $0.20 < d10/f < 0.90$ where BF is a back focus of the scanner lens, L is a total lens length, f1 is a focal length of e-line of the first lens group, f is a focal length of e-line of the entire lens system and d10 is an air space between the fifth and six lenses.

9 Claims, 12 Drawing Sheets

(56) References Cited

U.S. PATENT DOCUMENTS

| | | |
|---|---|---|
| 6,507,444 B2 | 1/2003 | Hayashide et al. |
| 2002/0101665 A1 | 8/2002 | Ohashi et al. |
| 2003/0234984 A1* | 12/2003 | Nagahara ................ 359/680 |
| 2008/0278779 A1 | 11/2008 | Nishina et al. |
| 2009/0323198 A1* | 12/2009 | Kusaka .................... 359/687 |
| 2010/0020367 A1 | 1/2010 | Abe et al. |
| 2010/0295985 A1* | 11/2010 | Matsusaka ............... 348/345 |
| 2011/0261467 A1* | 10/2011 | Arai ........................ 359/683 |
| 2012/0293704 A1* | 11/2012 | Sano et al. ............... 348/340 |
| 2013/0120858 A1* | 5/2013 | Sano ........................ 359/713 |
| 2013/0242362 A1* | 9/2013 | Nakayama et al. ...... 358/509 |

* cited by examiner

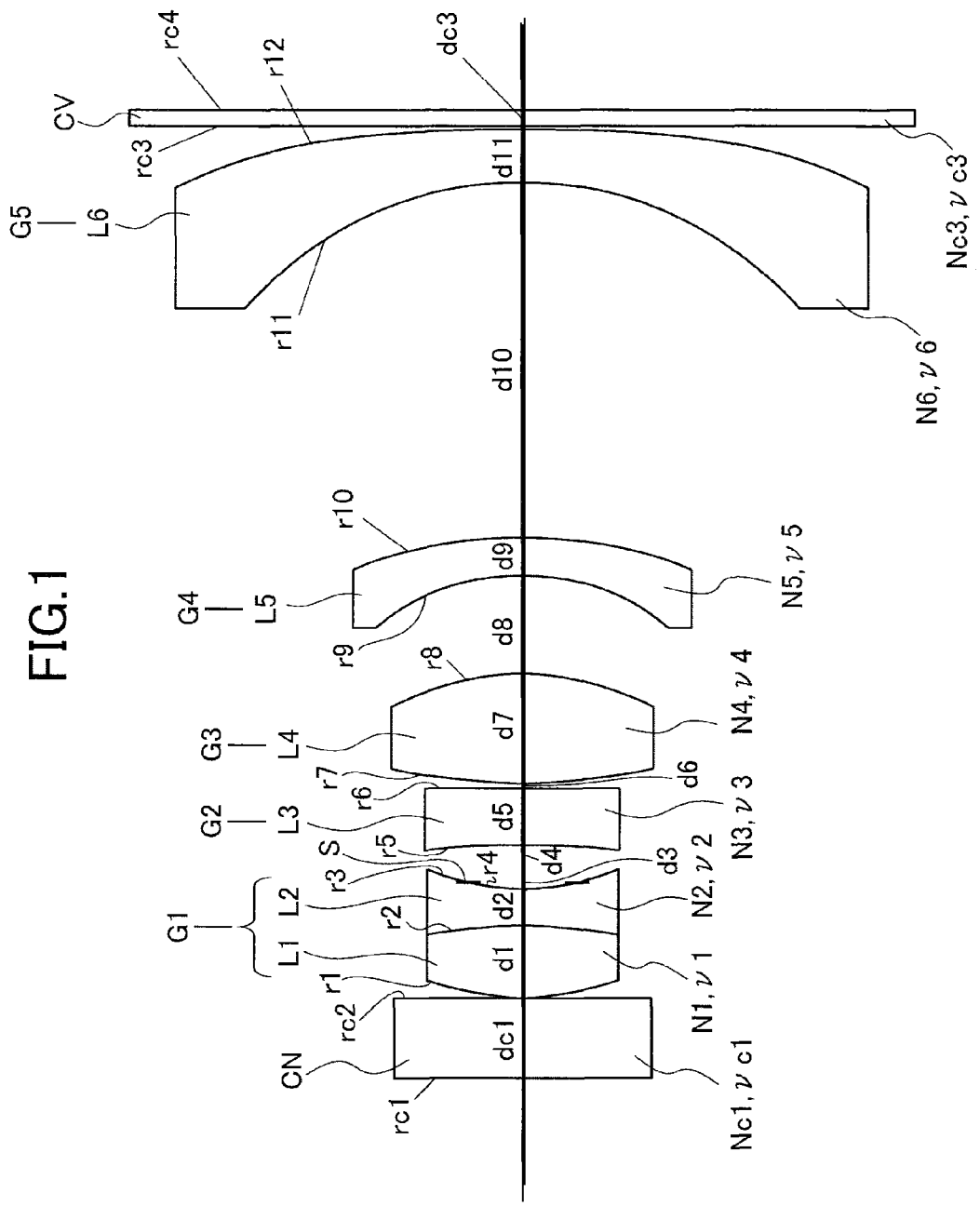

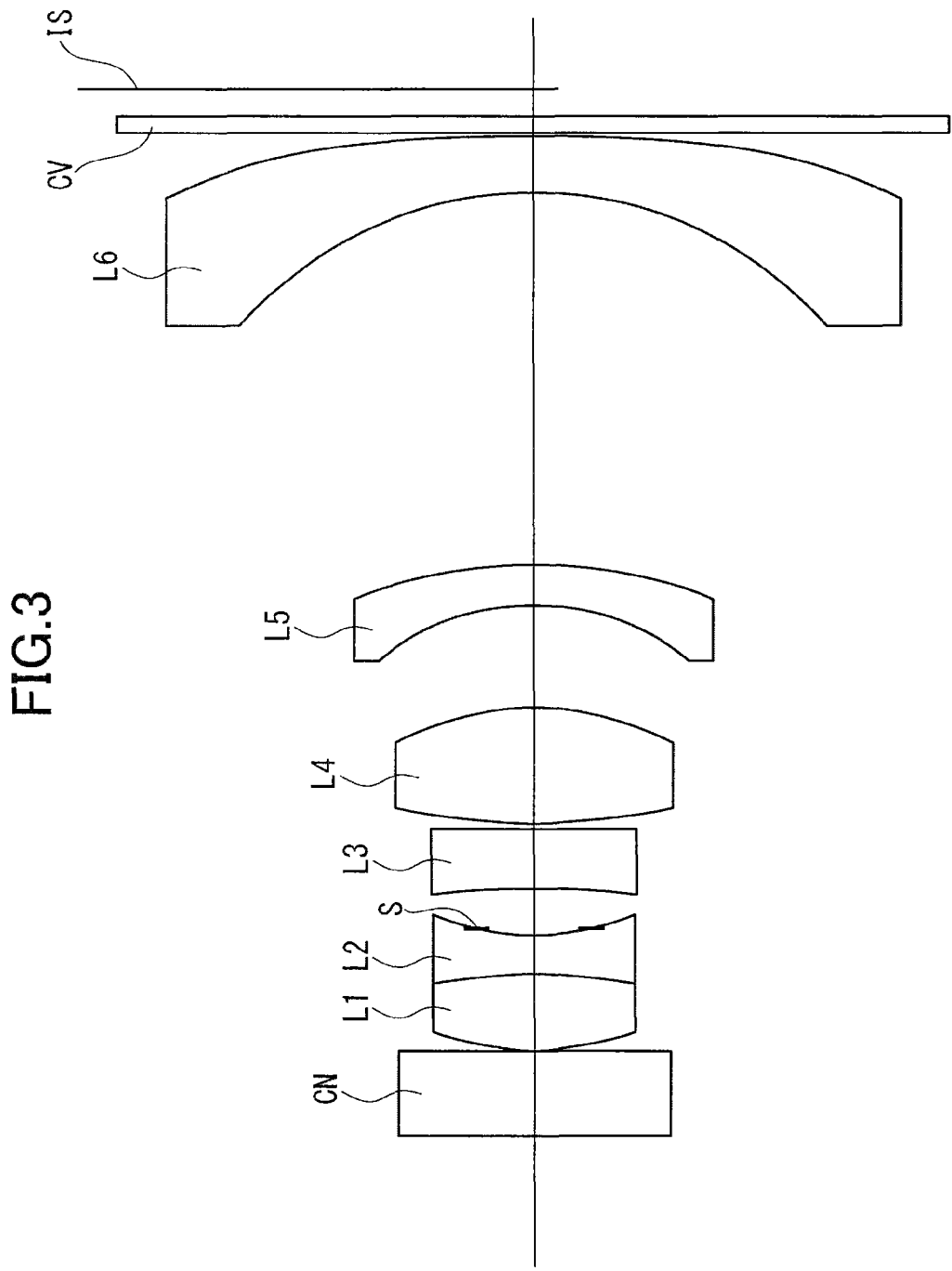

SCANNER LENS, IMAGE READER AND IMAGE FORMING DEVICE

CROSS REFERENCE TO RELATED APPLICATION

The present application is based on and claims priority from Japanese Patent Application No. 2012-175774, filed on Aug. 8, 2012, the disclosure of which is hereby incorporated by reference in its entirety.

BACKGROUND OF THE INVENTION

1. Field of the Invention

The present invention relates to a scanner lens, an image reader incorporating the scanner lens, and an image forming device incorporating the image reader.

2. Description of the Related Art

An image reader such as facsimile machine or digital copier is configured to reduce image information to read with a scanner lens and form an image thereof on a solid image sensor as CCD to convert the image information into signals. There is an optical system available which uses a 3-line CCD which is light receiving elements with red, green, blue filters arranged in three arrays on a single chip, to form an image of an original document in three original colors on the light receiving surface, thereby converting color image information into signals.

The scanner lens for use in such an optical system is required to exert a high contrast in a high spatial frequency range and about 100% aperture efficiency even in the periphery of angle of view. Further, to read color documents accurately, it is necessary to form red, green, and blue images at the same position along the optical axis on the light receiving surface and correct respective color aberrations precisely.

Moreover, there have been demands for the image reader not only to improve performance and function but also downsize and reduce manufacturing costs. For the purpose of downsizing the optical system, conjugation length needs to be shortened so that a lens with a wider angle of view is required while for cost reduction the number of lenses needs to be decreased.

For a scanner lens made up of a relatively small number of lenses and having a wide angle of view, Japanese Patent No. 3862446 (Reference 1) and Japanese Patent Application Publication No. 2002-244033 (Reference 2) disclose one with a half angle of view of about 30 degrees and made up of five groups, five lenses, and Japanese Patent No. 3939908 (Reference 3) and No. 4496231 (Reference 4) disclose one including an axisymmetric, aspheric lens, for example.

However, the lens disclosed in References 1 and 2 includes an anamorphic lens with different refractive power in directions orthogonal to each other, which is difficult to process, therefore expensive. Thus, cost reduction cannot be easily realized. Meanwhile, a half angle of view of the lens disclosed in References 3 and 4 is as narrow as 21.5 degrees so that the conjugation length of the optical system is large, which hinders downsizing.

Meanwhile, the scanner lens comprised of a small number of lenses cannot satisfy various demands for properly correcting axial color aberration in a wide range, field curvature at a very wide angle and various types of aberrations, for exerting very high aperture efficiency at high F-number, and for exerting high contrast in a high spatial frequency range.

SUMMARY OF THE INVENTION

The present invention aims to provide a scanner lens comprising a small number of lenses which can properly correct axial color aberration in a wide range of C-line, 656.27 nm to g-line, 435.83 nm, curvature field at a wide angle over a half angle of view of 30 degrees and various types of aberration, and exert F-number of about 5.6, about 100% aperture efficiency even in the periphery of angle of view, and high contrast in a high spatial frequency range.

According to one aspect of the present invention, a scanner lens comprises a first lens group having a positive refractive power, comprising a first positive lens and a second negative lens which are cemented, a second lens group comprising a third negative lens, a third lens group comprising a fourth positive lens, a fourth lens group comprising a fifth negative lens, a fifth lens group comprising a sixth negative lens, the first to fifth groups being arranged in order from an object side to an image side, and an aperture stop disposed between the first lens group and the second lens group, wherein the scanner lens is configured to satisfy the following three conditions:

$$0.01 < BF/L < 0.10$$

$$0.50 < f1/f < 9.5$$

$$0.20 < d10/f < 0.90$$

where BF is a back focus of the scanner lens, L is a total lens length, f1 is a focal length of an e-line of the first lens group, f is a focal length of an e-line of an entire lens system and d10 is an air space between the fifth and six lenses.

BRIEF DESCRIPTION OF THE DRAWINGS

Features, embodiments, and advantages of the present invention will become apparent from the following detailed description with reference to the accompanying drawings:

FIG. 1 is a schematic cross section view of the structure of a scanner lens by way of example;

FIG. 3 is a schematic cross section view of a lens structure according to a first embodiment;

DETAILED DESCRIPTION OF THE PREFERRED EMBODIMENTS

Figure 2A:
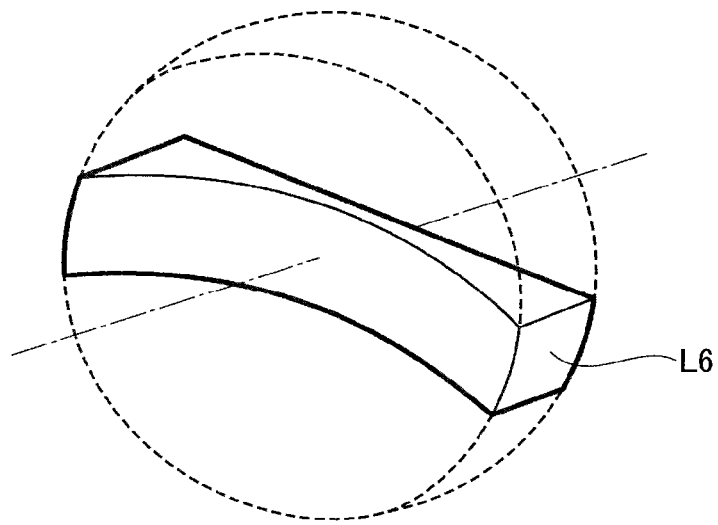
FIGS. 2A, 2B show an example of the outer shape of a sixth lens.

Hereinafter, embodiments of a scanner lens, an image reader and an image forming device will be described in detail with reference to the accompanying drawings. Wherever possible, the same reference numbers will be used throughout the drawings to refer to the same or like parts.

FIG. 1 shows the structure of a scanner lens according to one embodiment by way of example. The scanner lens comprises, from an object side to an image side, a first lens group G1 having a positive refractive power and including a cemented lens of a first positive lens L1 and a second negative lens L2, a second lens group G2 including a third negative lens L3, a third lens group G3 including a fourth positive lens L4, a fourth lens group G4 including a fifth negative lens L5, and a fifth lens group G5 including a sixth negative lens L6. An aperture stop S is provided between the first and second lens groups G1, G2. A contact glass CN is disposed on an object side of the first lens L1 while a CCD cover glass CV is disposed on an image side of the sixth lens L6.

The codes in FIG. 1 denote as follows:

ri (i=1 to 12): curvature radius of an i-th lens surface from an object side;

di (i=1 to 11): i-th interval between lens surfaces from an object side;

Nj (j=1 to 6): refractive index of a lens material of a j-th interval from an object side;

vj (j=1 to 6): abbe number of a lens material of a j-th interval from an object side;

rc1: curvature radius of object side of contact glass rc2: curvature radius of image side of contact glass rc3: curvature radius of object side of CCD cover glass rc4: curvature radius of image side of CCD cover glass dc1: thickness of contact glass dc3: thickness of CCD cover glass Nc1: refractive index of contact glass vc1: abbe number of CCD cover glass Nc3: refractive index of contact glass vc3: abbe number of CCD cover glass The scanner lens is configured to satisfy the following three conditions:

$$0.01 < BF/L < 0.10 \quad\quad\quad 1$$

$$0.50 < f1/f < 9.5 \quad\quad\quad 2$$

$$0.20 < d10/f < 0.90 \quad\quad\quad 3$$

where BF is a back focus of the scanner lens, L is a total lens length, f1 is a focal length of an e-line of the first lens group G1, f is a focal length of an e-line of a total lens system and d10 is an air space between the fifth and six lenses L5, L6.

The first condition defines the ratio of a back focus BF relative to the total lens length L. Herein, back focus BF refers to an interval between an image-side surface of the fifth lens group G5 or sixth lens L6 and an image plane IS in non-use. If a value of BF/L exceeds the upper limit value of 0.10, the size of the first to forth lens groups are enlarged, incurring overall cost increases. Meanwhile, if it is below the lower limit value of 0.01, an interval between the scanner lens and image plane IS is shortened, which may cause out-of-focus due to a temperature change or flares by reflection between the lens surfaces.

The second condition defines the refractive power of the first lens group G1. With the value of f1/f exceeding the upper value of 9.5, spherical aberration cannot be sufficiently corrected. With the value below the lower limit value of 0.50, spherical aberration is excessively corrected, both of which worsens coma aberration and deteriorates the imaging performance of the scanner lens.

The third condition defines the ratio of the air space d10 between the fifth and sixth lenses L5, L6 and the focal length f of the e-line of the entire lens system With the value of d10/f exceeding the upper value of 0.90, spherical aberration cannot be sufficiently corrected, which brings a decrease in contrast. With the value below the lower limit value of 0.20, it is difficult to correct curvature of field so that the levelness of the image plane is not secured, deteriorating the imaging performance of the scanner lens.

Thus, the scanner lens satisfying the first to third conditions can correct color aberration on the axis in a wide range of C-line to g-line and correct curvature of field at a very wide angle as half angle of view of 30 degrees. Further, it has F-number of about 5.6 and almost 100% aperture efficiency even in the periphery of angle of view, and it can correct various types of aberrations properly and exert high contrast in a high spatial frequency range.

According to the scanner lens an incident surface of the first lens L1 can be aspheric to function to correct aberration. Because of this, the lenses arranged closer to the image plane than the first lens L1 can be downsized.

Further, the image-side surface of the sixth lens L6 can be aspheric. The sixth lens L6 is close to the image plane IS and the off-axial optical height thereof is higher than the other lenses so that light can be sufficiently separated. Accordingly, the aspheric surface can effectively correct off-axial aberration.

Furthermore, the sixth lens L6 can be made from plastic so that the aspheric surface can be precisely processed. Due to the closeness to the image plane IS, the diameter of the sixth lens L6 needs to be as large as the length of the line sensor, which results in greatly increasing the costs of the scanner lens and increasing the height of an image reader incorporating the scanner lens. In view of this, the sixth lens made from plastic less expensive than glass contributes to reducing manufacturing costs.

Figure 2B:
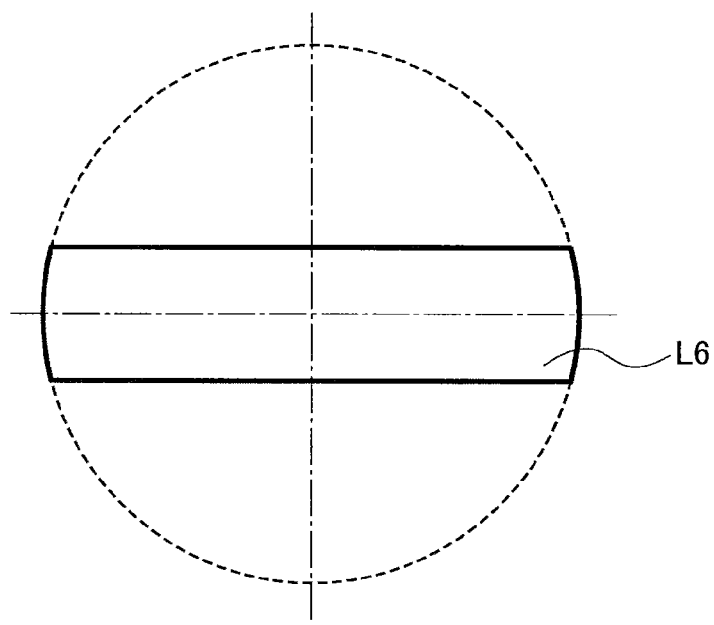

Further, for size reduction the outer shape of the sixth lens can be a strip long in main scan direction. Herein, main scan direction refers to a direction in which line sensors are arranged in arrays. FIG. 2A is a perspective view of an example of the outer shape of the sixth lens L6 and FIG. 2B is a front cross section view thereof.

A later-described image reader forms an image of an original document as lines so that the outer shape of the scanner lens does not have to be rotationally symmetric relative to the optical axis. Accordingly, the sixth lens L6 in strip shape in FIGS. 2A, 2B can contribute to thinning and downsizing the image reader and reducing the costs of the scanner lens.

Hereinafter, the first to fourth embodiments of the scanner lens 10 is described, referring to FIGS. 3 to 10. Specific numeral data thereof are shown in tables 1 to 9. Codes and symbols used in the tables denote as follows:

f: total focal length of e-line of total lens system
FNo: F-number
m: shrinkage ratio
Y: object height
ω: half field of angle
BF: back focus of scanner lens
L: total lens length
r: curvature radius of lens surface
d: interval between two lens surfaces
nd: refractive index of d-line of each lens material
vd: abbe number of d-line of each lens material
ne: refractive index of e-line of each lens material
f1: focal length of e-line of first lens group G1
d10: air space between fifth and sixth lenses L5, L6

In the tables 1, 3, 5, 7, c1 is an object-side surface of the contact glass, c2 is an image-side surface thereof, No. 1 to 12 are lens surface numbers of the scanner lens from the object side, c3 is an object-side surface of the CCD cover glass and c4 is an image-side surface thereof.

The aspheric surface is expressed by the following known formula:

$$X = \frac{(1/R) \times Y^2}{1 + SQRT(1 - (1+K) \times (Y/R)^2)} + A4 \times Y^4 + A6 \times Y^6 + A8 \times Y^8 + A10 \times Y^{10}$$

where X is an distance from a tangent of apex of aspheric surface at height Y, Y is height from the optical axis, R is a paraxial curvature of aspheric surface, K is a conic constant, A4, A6, A8, A10 are aspheric coefficients, and SQRT is a square root. Further, in the tables 2, 4, 6, 8, E–XY denotes $10^{-XY}$ and E–12 denotes $10^{-12}$.

In the aberration curves of FIGS. 4, 6, 8, and 10 "e" is e-line (546.07 nm), "g" is g-line (436.83 nm), "c" is C-line (656.27 nm) and F is F-line (486.13 nm). In the spherical aberration the broken line indicates sine condition. In the astigmatism the solid line indicates sagittal light beam and the broken line indicates meridional light beam.

First Embodiment

Figure 4:
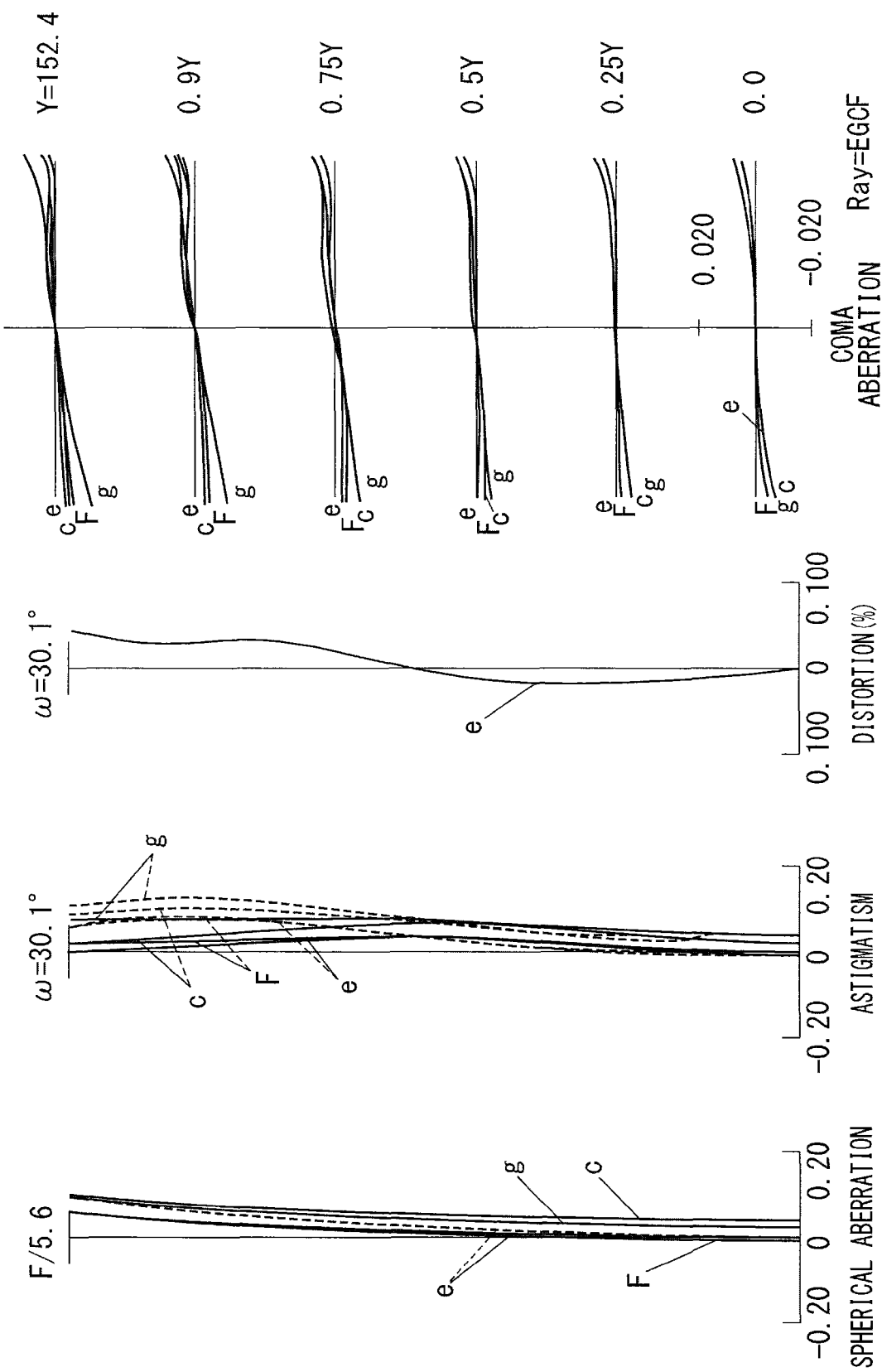
FIG. 4 shows the aberration curves of the lens structure according to the first embodiment.

FIG. 3 shows the lens structure of the scanner lens according to the first embodiment and FIG. 4 shows aberration curves thereof. The following table 1 shows specific numerical data about the lenses thereof.

TABLE 1 f = 26.319, FNo = 5.6, m = 0.11102, Y = 152.4, ω = 30.1°, BF = 1.698, L = 35.0

| SURFACE NUMBER | r | d | nd | νd | ne | GLASS NAME |
|---|---|---|---|---|---|---|
| c1 | ∞ | 3.200 | 1.5163 | 64.14 | 1.51825 | SBSL7(OHARA) |
| c2 | ∞ | | | | | |
| 1 | 11.614 | 2.882 | 1.6779 | 54.89 | 1.68084 | LLAL12 (OHARA) |
| 2 | −21.393 | 1.500 | 1.6541 | 39.68 | 1.65803 | SNBH5 (OHARA) |
| 3 | 10.964 | 0.248 | | | | |
| 4 | ∞ (APERTURE) | 1.500 | | | | |
| 5 | −40.000 | 2.287 | 1.6541 | 39.68 | 1.65803 | SNBH5 (OHARA) |
| 6 | −747.318 | 0.200 | | | | |
| 7 | 26.343 | 4.377 | 1.6180 | 63.33 | 1.62033 | SPHM52 (OHARA) |
| 8 | −12.121 | 4.000 | | | | |
| 9 | −10.099 | 1.500 | 1.6141 | 54.99 | 1.61671 | SBSM9 (OHARA) |
| 10 | −20.341 | 14.332 | | | | |
| 11 | −15.950 | 2.173 | 1.5286 | 55.53 | 1.53106 | ZE48R(ZEONEX) |
| 12 | −200.000 | | | | | |
| c3 | ∞ | 0.700 | 1.5163 | 64.14 | 1.51825 | SBSL7(OHARA) |
| c4 | ∞ | | | | | |

Table 2 shows conic constant K of aspheric surfaces and aspheric coefficients in the first embodiment.

TABLE 2

| SURFACE NUMBER | K | A4 | A6 | A8 | A10 |
|---|---|---|---|---|---|
| 1 | 0 | −8.71348E−05 | −2.97160E−10 | −9.69017E−08 | 1.65982E−09 |
| 12 | 0 | −6.86305E−05 | 2.14873E−07 | −6.35582E−10 | 1.04937E−12 |

Second Embodiment

Figure 5:
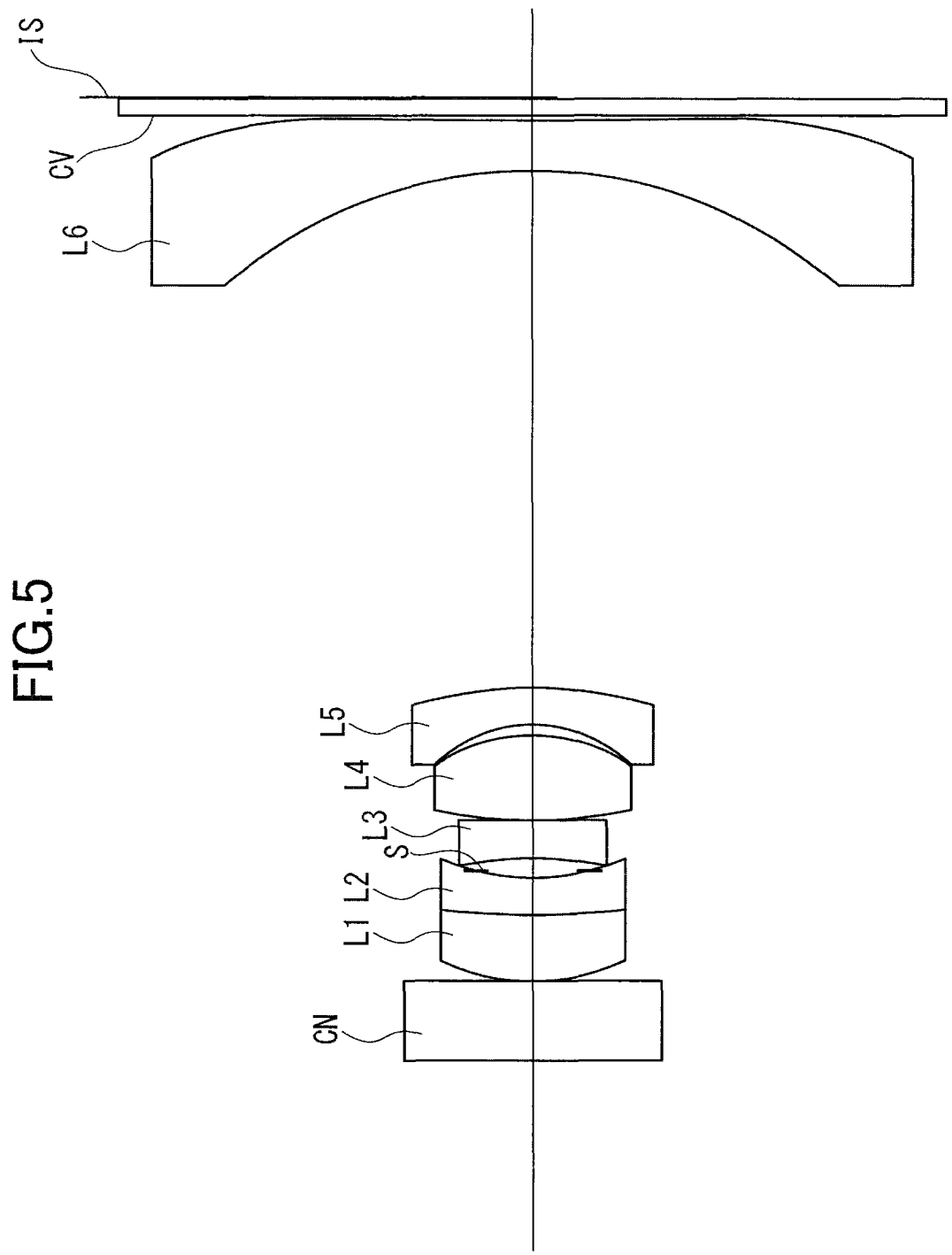
FIG. 5 is a schematic cross section view of a lens structure according to a second embodiment.
Figure 6:
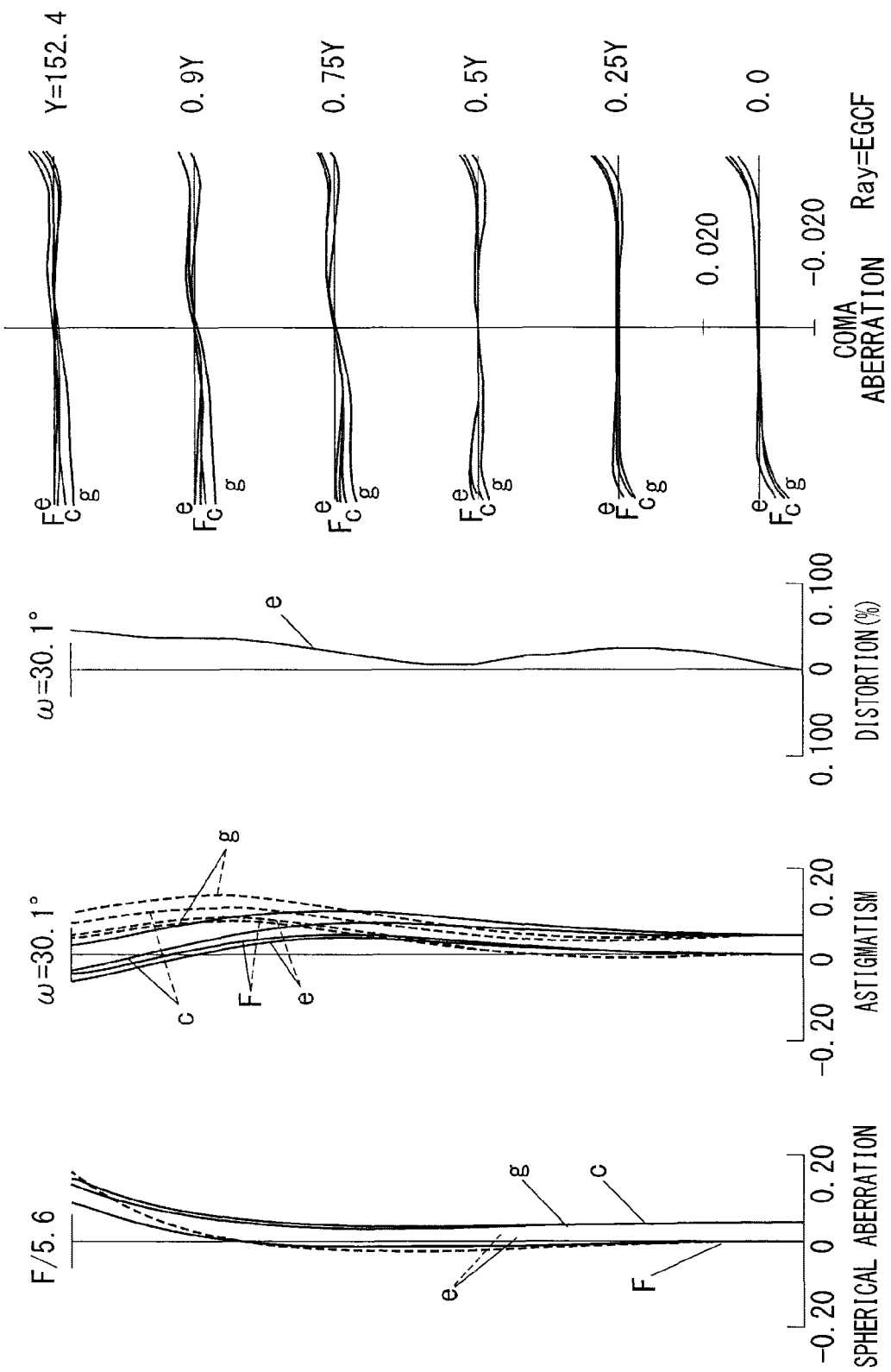
FIG. 6 shows the aberration curves of the lens structure according to the second embodiment.

FIG. 5 shows the lens structure of the scanner lens according to the second embodiment and FIG. 6 shows aberration curves thereof. The following table 3 shows specific numerical data about the lenses thereof.

TABLE 3 f = 26.317, FNo = 5.6, m = 0.11102, Y = 152.4, ω = 30.1°, BF = 0.799, L = 34.914

| SURFACE NUMBER | r | d | nd | νd | ne | GLASS NAME |
|---|---|---|---|---|---|---|
| c1 | ∞ | 3.200 | 1.5163 | 64.14 | 1.51825 | SBSL7(OHARA) |
| c2 | ∞ | | | | | |
| 1 | 9.072 | 2.724 | 1.6779 | 54.89 | 1.68084 | LLAL12 (OHARA) |
| 2 | 37.509 | 1.500 | 1.8503 | 32.27 | 1.85649 | SLAH71 (OHARA) |
| 3 | 10.075 | 0.251 | | | | |
| 4 | ∞ (APERTURE) | 0.500 | | | | |
| 5 | −21.891 | 1.500 | 1.5481 | 45.79 | 1.55098 | STIL1 (OHARA) |
| 6 | −142.740 | 0.100 | | | | |
| 7 | 24.063 | 3.455 | 1.6031 | 60.64 | 1.60548 | SBSM14 (OHARA) |
| 8 | −7.249 | 0.384 | | | | |
| 9 | −6.258 | 1.500 | 1.5182 | 58.90 | 1.52033 | SNSL3 (OHARA) |
| 10 | −18.618 | 21.000 | | | | |
| 11 | −19.773 | 2.000 | 1.5286 | 55.53 | 1.53106 | ZE48R(ZEONEX) |
| 12 | 232.728 | | | | | |
| c3 | ∞ | 0.700 | 1.5163 | 64.14 | 1.51825 | SBSL7(OHARA) |
| c4 | ∞ | | | | | |

Table 4 shows conic constant K of aspheric surfaces and aspheric coefficients in the second embodiment.

TABLE 4

| SURFACE NUMBER | K | A4 | A6 | A8 | A10 |
|---|---|---|---|---|---|
| 1 | 0 | −4.26276E−05 | −4.93956E−07 | −8.99926E−08 | 4.04208E−10 |
| 12 | 0 | 9.89461E−06 | −3.55677E−07 | 9.11556E−10 | −6.06130E−13 |

Table 6 shows conic constant K of aspheric surfaces and aspheric coefficients in the third embodiment.

TABLE 6

| SURFACE NUMBER | K | A4 | A6 | A8 | A10 |
|---|---|---|---|---|---|
| 1 | 0 | −4.77071E−05 | 6.88470E−07 | −6.09547E−08 | 1.06089E−09 |
| 12 | 0 | −1.32931E−04 | 4.11198E−07 | −1.60057E−09 | 2.05348E−12 |

Third Embodiment

Figure 7:
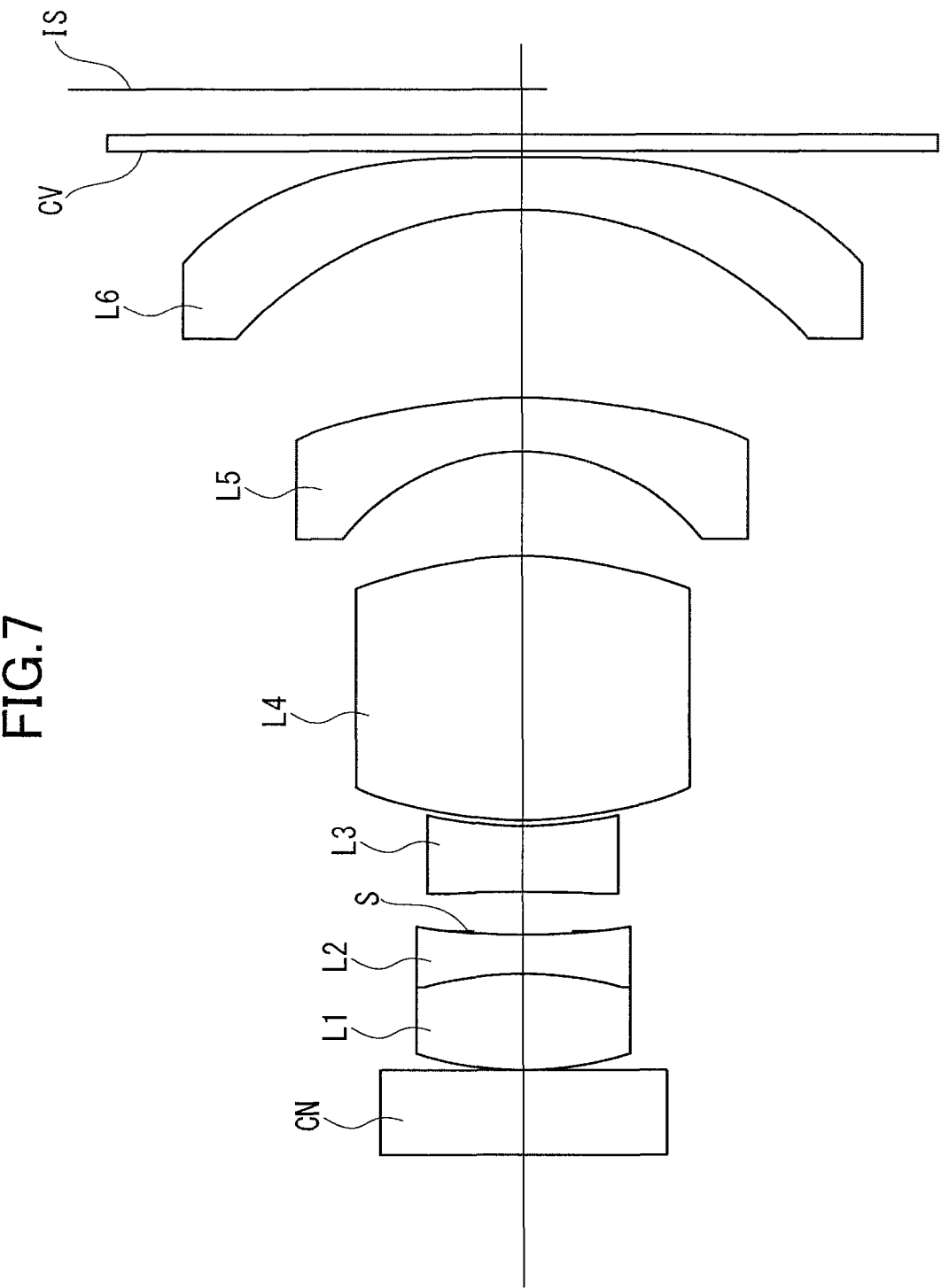
FIG. 7 is a schematic cross section view of a lens structure according to a third embodiment.
Figure 8:
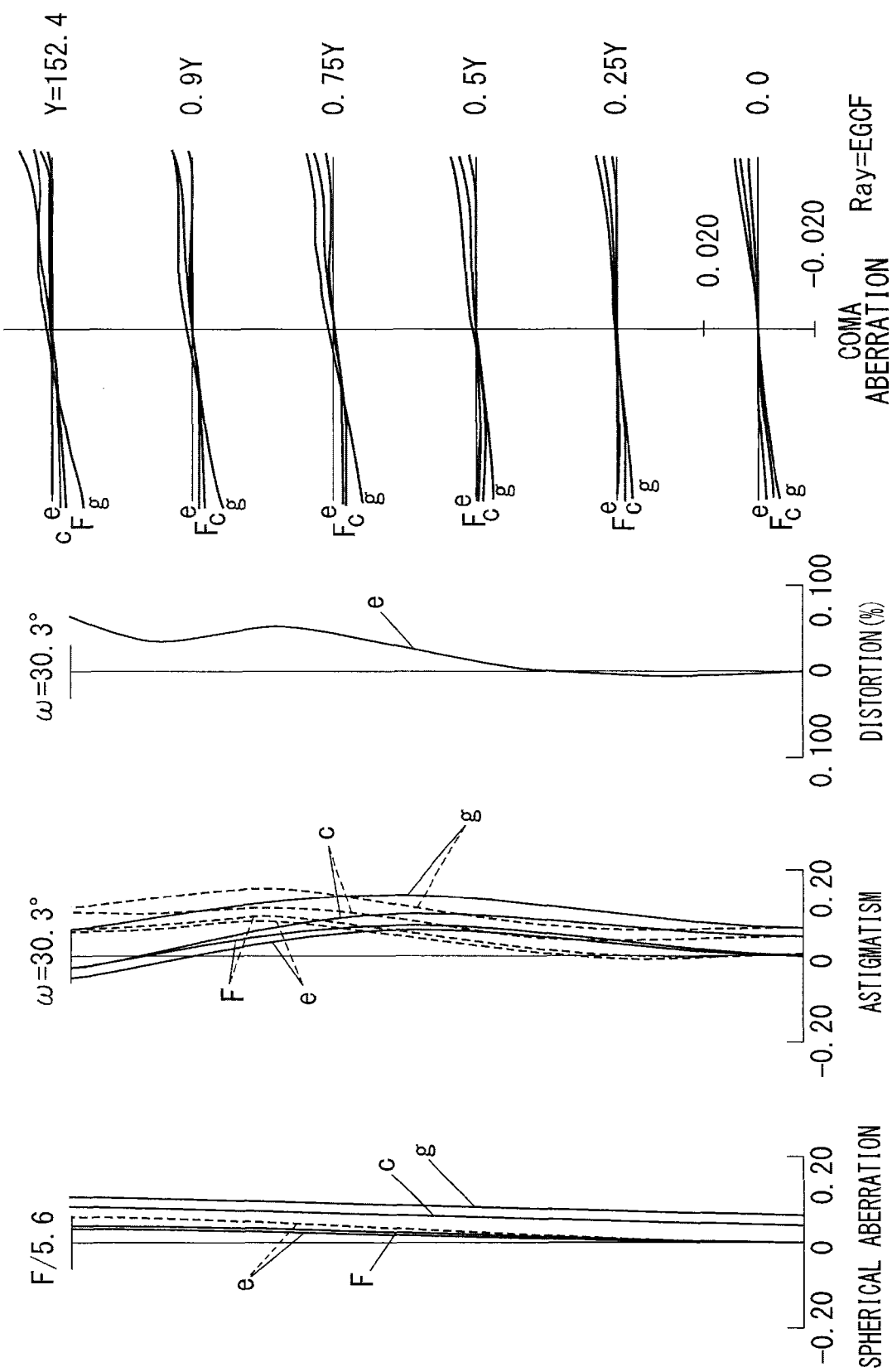
FIG. 8 shows the aberration curves of the lens structure according to the third embodiment.

FIG. 7 shows the lens structure of the scanner lens according to the third embodiment and FIG. 8 shows aberration curves thereof. The following table 5 shows specific numerical data about the lenses thereof.

Fourth Embodiment

Figure 9:
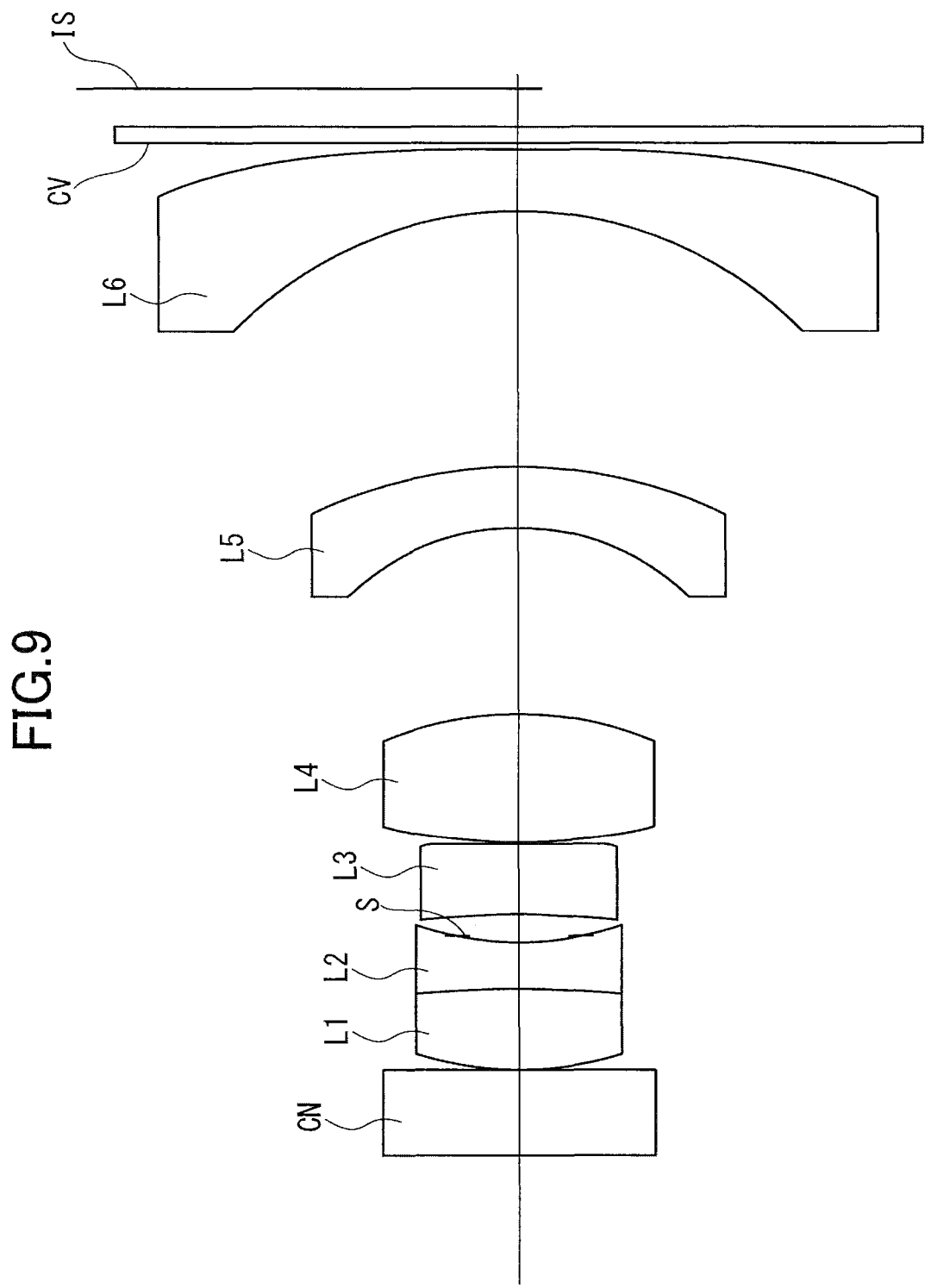
FIG. 9 is a schematic cross section view of a lens structure according to a fourth embodiment.
Figure 10:
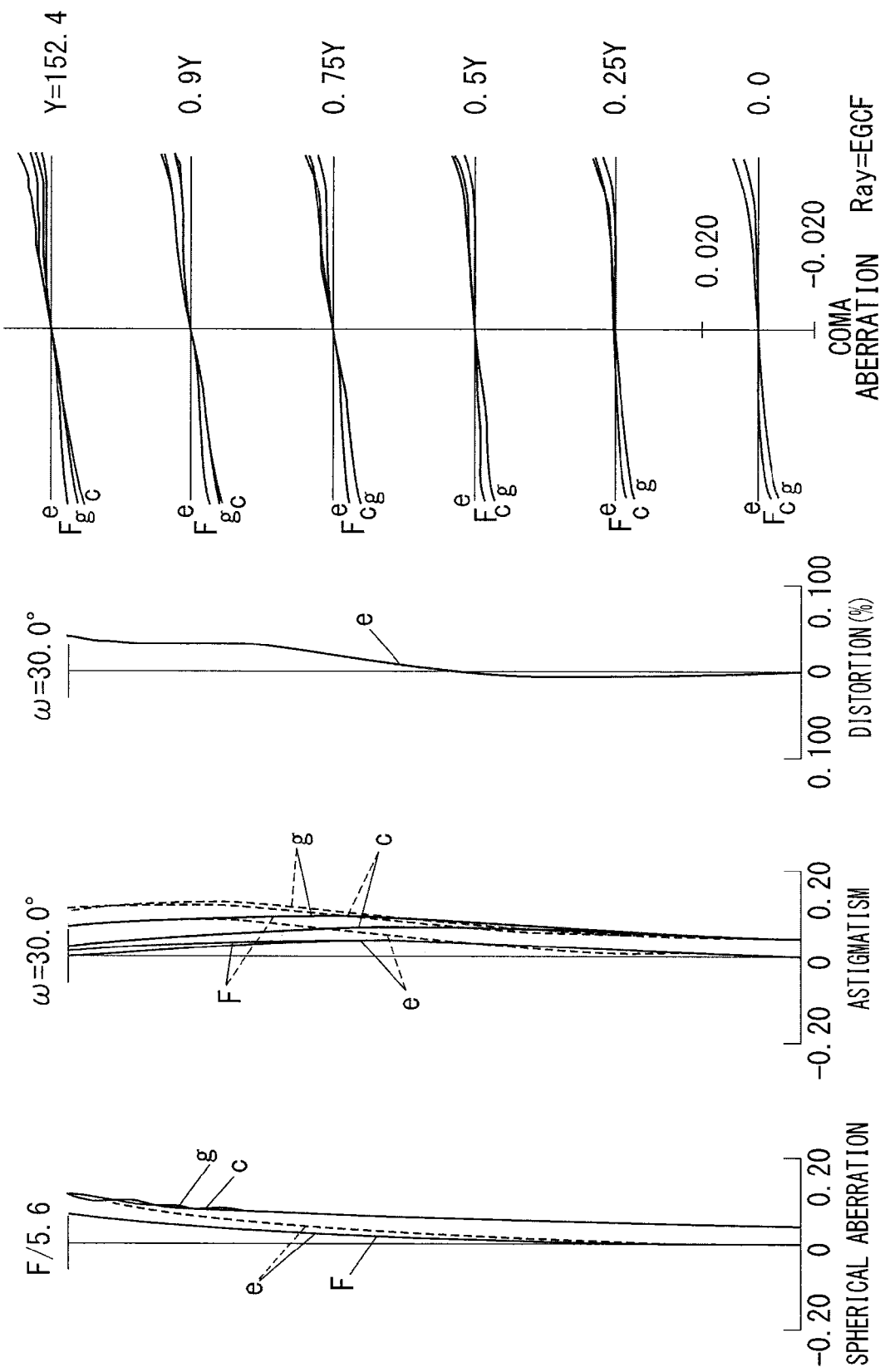
FIG. 10 shows the aberration curves of the lens structure according to the fourth embodiment FIG. 11 schematically shows the structure of an image reader by way of example.

FIG. 9 shows the lens structure of the scanner lens according to the fourth embodiment and FIG. 10 shows aberration curves thereof. The following table 7 shows specific numerical data about the lenses thereof.

TABLE 5 f = 26.071, FNo = 5.6, m = 0.11102, Y = 152.4, ω = 30.3°, BF = 2.289, L = 34.582

| SURFACE NUMBER | r | d | nd | νd | ne | GLASS NAME |
|---|---|---|---|---|---|---|
| c1 | ∞ | 3.200 | 1.5163 | 64.14 | 1.51825 | SBSL7(OHARA) |
| c2 | ∞ | | | | | |
| 1 | 14.251 | 3.623 | 1.6779 | 54.89 | 1.68084 | LLAL12 (OHARA) |
| 2 | −17.969 | 1.500 | 1.5317 | 48.84 | 1.53430 | STIL6 (OHARA) |
| 3 | 30.270 | 0.116 | | | | |
| 4 | ∞ (APERTURE) | 1.500 | | | | |
| 5 | −94.050 | 2.496 | 1.8467 | 23.78 | 1.85504 | STIH53 (OHARA) |
| 6 | 18.905 | 0.200 | | | | |
| 7 | 19.056 | 10.000 | 1.7620 | 40.10 | 1.76651 | SLAM55 (OHARA) |
| 8 | −17.703 | 4.000 | | | | |
| 9 | −9.086 | 2.000 | 1.5481 | 45.79 | 1.55098 | STIL1 (OHARA) |
| 10 | −25.459 | 7.147 | | | | |
| 11 | −15.442 | 2.000 | 1.5286 | 55.53 | 1.53106 | ZE48R(ZEONEX) |
| 12 | −101.659 | | | | | |
| c3 | ∞ | 0.700 | 1.5163 | 64.14 | 1.51825 | SBSL7(OHARA) |
| c4 | ∞ | | | | | |

TABLE 7 f = 26.349, FNo = 5.6, m = 0.11102, Y = 152.4, ω = 30.0°, BF = 2.086, L = 35.0

| SURFACE NUMBER | r | d | nd | νd | ne | GLASS NAME |
|---|---|---|---|---|---|---|
| c1 | ∞ | 3.200 | 1.5163 | 64.14 | 1.51825 | SBSL7(OHARA) |
| c2 | ∞ | | | | | |
| 1 | 12.788 | 3.065 | 1.6779 | 54.89 | 1.68084 | LLAL12 (OHARA) |
| 2 | −47.673 | 1.779 | 1.7495 | 35.28 | 1.75453 | SLAM7 (OHARA) |
| 3 | 13.457 | 0.213 | | | | |
| 4 | ∞ (APERTURE) | 0.800 | | | | |
| 5 | −36.767 | 2.683 | 1.5174 | 52.43 | 1.51976 | SNSL36 (OHARA) |
| 6 | −157.313 | 0.100 | | | | |
| 7 | 25.273 | 4.879 | 1.6180 | 63.33 | 1.62033 | SPHM52(OHARA) |
| 8 | −14.140 | 7.062 | | | | |
| 9 | −10.034 | 2.316 | 1.5317 | 48.84 | 1.53430 | STIL6 (OHARA) |
| 10 | −19.849 | 9.715 | | | | |
| 11 | −16.413 | 2.387 | 1.5286 | 55.53 | 1.53106 | ZE48R(ZEONEX) |
| 12 | −193.533 | | | | | |
| c3 | ∞ | 0.700 | 1.5163 | 64.14 | 1.51825 | SBSL7(OHARA) |
| c4 | ∞ | | | | | |

Table 8 shows conic constant K of aspheric surfaces and aspheric coefficients in the fourth embodiment.

TABLE 8

| SURFACE NUMBER | K | A4 | A6 | A8 | A10 |
|---|---|---|---|---|---|
| 1 | 0 | −7.73533E−05 | −1.16154E−07 | −7.05463E−08 | 1.14037E−09 |
| 12 | 0 | −4.61916E−05 | 1.28710E−07 | −3.77397E−10 | 6.42839E−13 |

Table 9 shows the values of parameters in the first to third conditions in the above embodiments.

TABLE 9

| | CONDITION (1) BF/L | CONDITION (2) f1 | f1/f | d10 | CONDITION (3) d10/f |
|---|---|---|---|---|---|
| 1st EMBODIMENT | 0.049 | 113.208 | 4.301 | 14.332 | 0.545 |
| 2nd EMBODIMENT | 0.023 | 100.775 | 3.829 | 21.000 | 0.798 |
| 3rd EMBODIMENT | 0.066 | 24.871 | 0.954 | 7.147 | 0.274 |
| 4th EMBODIMENT | 0.060 | 240.000 | 9.109 | 9.715 | 0.369 |

As obvious from the table 9, the scanner lens according to any of the first to fourth embodiments satisfies the first to third conditions, 0.01<BF/L<0.10, 0.50<f1/f<9.5, and 0.20<d10/f<0.90.

Further, as evident from the aberration curves of FIGS. 4, 6, 8 and 10, the scanner lens according to any of the first to fourth embodiments can properly correct axial color aberration in a wide range of C-line, 656.27 nm to g-line, 435.83 nm, curvature field at a wide angle over a half angle of view of 30 degrees and various types of aberration, as well as exert F-number of about 5.6, about 100% aperture efficiency even in the periphery and high contrast in a high spatial frequency range.

Fifth Embodiment

Figure 11:
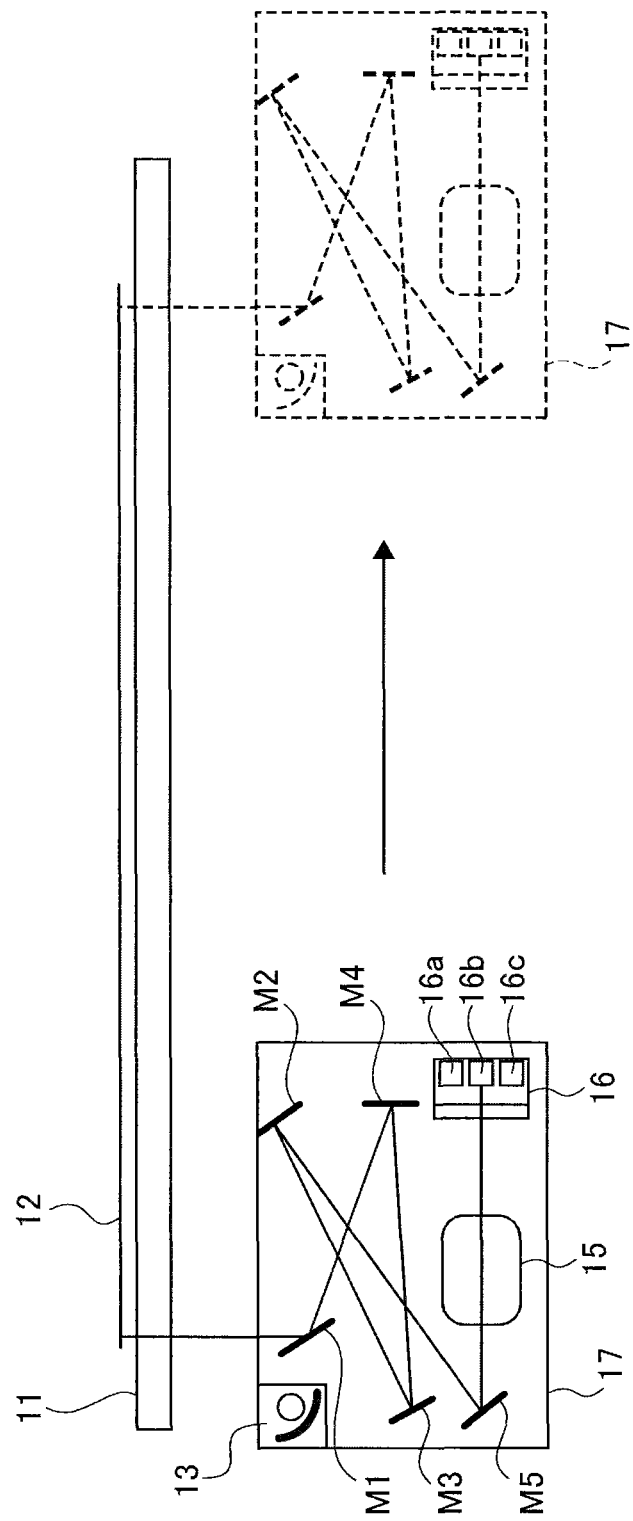

FIG. 11 shows an example of the structure of an image reader. The image reader comprises an illumination system 13 to illuminate an original document 12, a scanner lens 15 to form a reduced image of light reflected by the original document, and a line sensor 16 to photoelectrically convert the image of the original document formed by the scanner lens.

In FIG. 11 the original document is placed on a contact glass 11 under which the illumination system 13 is disposed. The illumination system 13 comprises a tube lamp as light source long in a direction orthogonal to the drawing and a reflector, to illuminate a slit-like portion long in the orthogonal direction.

The light source can be a xenon lamp, halogen lamp, or LED but preferably LED in view of reducing power consumption of the optical system and energy saving.

The reflected light from the original document 12 is reflected by returning mirrors M1 to M5 in order, and through the scanner lens 15 a reduced image of the original document is formed on the surface of the line sensor 16. Note that the number of returning mirrors can be arbitrarily decided instead of 5.

The illumination system 13, returning mirrors M1 to M5, scanner lens 15 and line sensor 16 are integrally held in an image reader unit 17 and driven by a not-shown driver rightward as indicated by the arrow to the position indicated by the broken lines, to read the information about the original document.

The image reader further comprises a color separator on the optical path of the scanner lens 15 to read the document image in full color. The line sensor 16 is a 3-line CCD which is photoelectric converters 16a, 16b, 16c as the color separator with red, green, blue filters arranged in three arrays on a single chip, to convert a document image to image signals along with the illumination and scanning of the original document 12. Thus, a read color image of the original document is separated in three original colors, red (R), green (G), blue (B).

The color separator can be alternatively realized by selectively inserting a prism or filter between the scanner lens 15 and line sensor 16 to separate an image into RGB colors or turning on three RGB light sources for illuminating the original document. In addition the document can be read in monochrome without the color separator on the optical path of the scanner lens 15.

The axial color aberration of the scanner lens 15 is properly corrected. By use of such a scanner lens, the image reader can read images in full color with high quality and the multifunction and high performance thereof can be achieved.

Sixth Embodiment

Figure 12:
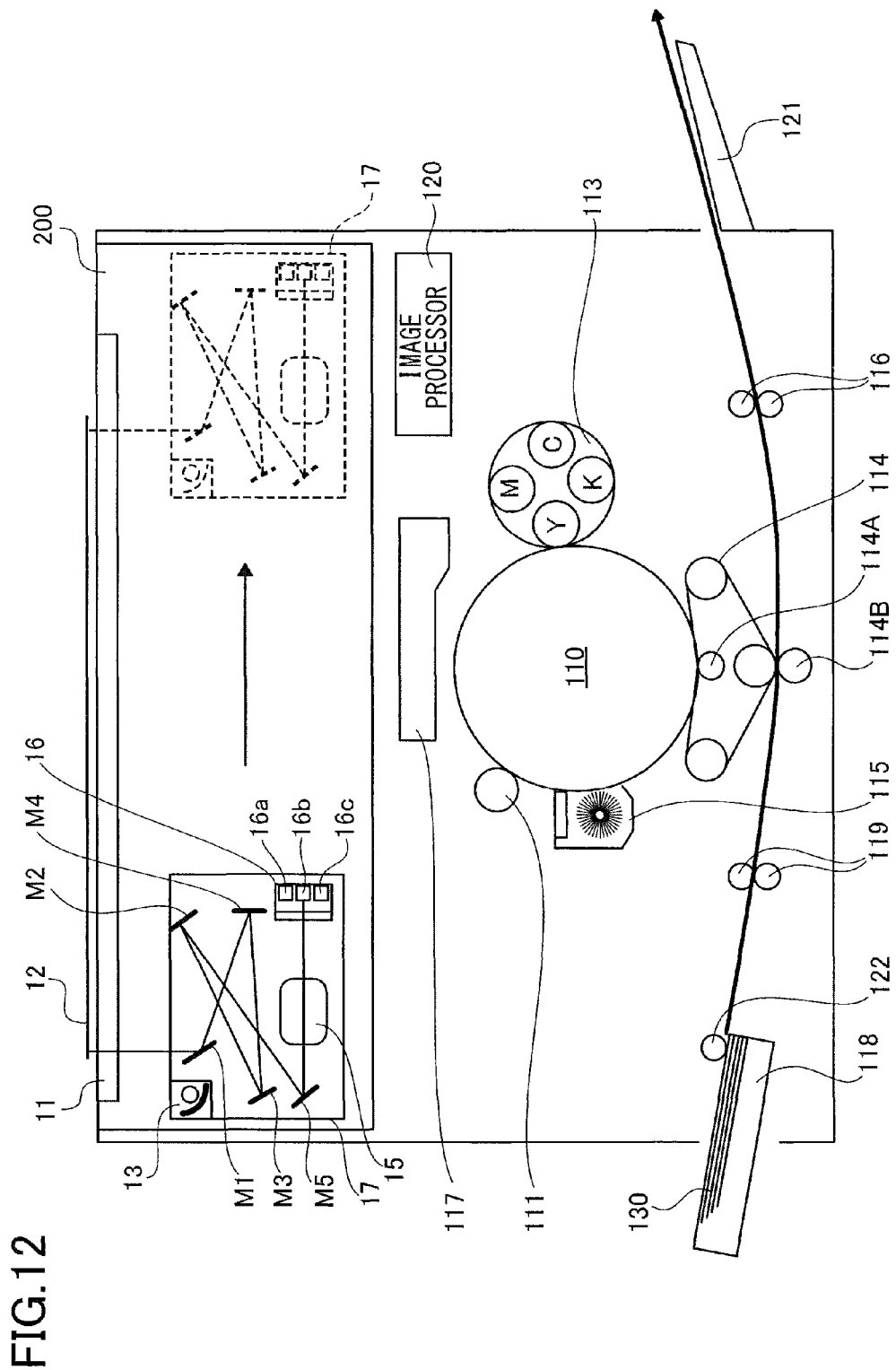
FIG. 12 schematically shows the structure of an image forming device by way of example.

FIG. 12 shows one example of an image forming device incorporating the image reader according to the fifth embodiment.

In FIG. 12 the image forming device comprises an image reader 200 in a top part and an imaging forming unit in a bottom part. The image reader 200 is the same as the one in FIG. 11.

The 3-line line sensor 16 of the image reader unit 17 outputs an image signal to an image processor 120 and the image processor 120 converts it to a write signal for each of yellow, magenta, cyan, and black.

The image forming unit comprises a photoreceptor drum 110, and a charge roller 111, a revolver-type develop unit 113, a transfer belt 114, and a cleaner 115 around the photoreceptor drum. The charge roller 111 can be replaced with a corona charger.

The image forming unit further comprises an optical scanner, to optically scan the photoreceptor drum 111 between the charge roller 111 and develop unit 113 upon receiving the write signal from the image processor 120.

It further comprises a fuser 116, a paper cassette 118 containing papers 130, a resist roller pair 119, a feed roller 122, and a tray 121.

To form an electrostatic latent image, the photoreceptor drum is rotated clockwise at constant velocity, evenly charged by the charge roller 111 and exposed with a laser beam from the optical scanner 117. The image formed is a negative latent image and an image portion on the photoreceptor drum is exposed.

Along with the rotation of the photoreceptor drum 110, yellow, magenta, cyan, and black images are written in this order. The electrostatic latent images are reversely developed by developers Y for yellow toner, M for magenta toner, C for cyan toner, and K for black toner in order and visualized. The four toner images are transferred onto the transfer belt 114 sequentially by a voltage apply roller 114A and superimposed thereon to form a color image.

The paper cassette 118 is detachable from the device body. A topmost paper 130 is fed via the feed roller 122 from the cassette 118 set in the device body and a tip end thereof is caught by the resist roller pair 119.

The resist roller pair 119 sends the paper 130 to a transfer unit at a timing at which a color toner image is moved to a transfer position. In the transfer unit a transfer roller 114B presses the paper 130 to the color image to electrostatically transfer the color image onto the paper 130.

Then, the paper 130 is sent to the fuser 116 to fuse the color image and guided by a not-shown guide to be discharged to the tray 121 via a not-shown discharge roller pair. Remnant toner or paper dust is removed from the surface of the photoreceptor drum 110 by the cleaner 115 every time each toner image is transferred.

The image forming device comprises the image reader incorporating the scanner lens according to any of the first to fourth embodiments so that it can be manufactured at low cost and can generate high quality images on the basis of accurately read images.

The image forming device can be a tandem-type image forming device including four-color photoreceptor drums, and it can be configured to form monochrome images.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. A scanner lens comprising:
a first lens group having a positive refractive power, comprising a first positive lens and a second negative lens which are cemented;
a second lens group comprising a third negative lens;
a third lens group comprising a fourth positive lens;
a fourth lens group comprising a fifth negative lens;
a fifth lens group comprising a sixth negative lens, the first to fifth groups being arranged in order from an object side to an image side; and
an aperture stop disposed between the first lens group and the second lens group, wherein
the scanner lens is configured to satisfy the following three conditions:

$$0.01 < BF/L < 0.10$$

$$0.50 < f1/f < 9.5$$

$$0.20 < d10/f < 0.90$$

where BF is a back focus of the scanner lens, L is a total lens length, f1 is a focal length of an e-line of the first lens group, f is a focal length of an e-line of an entire lens system and d10 is an air space between the fifth and six lenses.

2. A scanner lens according to claim 1, wherein an incidence surface of the first lens is aspheric.

3. A scanner lens according to claim 1, wherein an image-side surface of the sixth lens is aspheric.

4. A scanner lens according to claim 1, wherein the sixth lens is made from plastic.

5. A scanner lens according to claim 1, wherein an outer shape of the sixth lens is a strip long in a main scan direction.

6. An image reader comprising:
an illumination system to illuminate an original document;
the scanner lens according to claim 1, to form a reduced image of a light reflected by the original document illuminated by the illumination system; and
a line sensor to photoelectrically convert the image of the original document formed by the scanner lens.

7. An image reader according to claim 6, further comprising
a color separator on an optical path of the scanner lens to read a color image of the original document in full color.

8. An image reader according to claim 6, wherein the illumination system includes an LED as a light source.

9. An image forming device comprising the image reader according to claim 6.

* * * * *